United States Patent
Hammontree et al.

(10) Patent No.: US 9,098,533 B2
(45) Date of Patent: Aug. 4, 2015

(54) VOICE DIRECTED CONTEXT SENSITIVE VISUAL SEARCH

(75) Inventors: Monty Lee Hammontree, Duvall, WA (US); Vikram Bapat, Seattle, WA (US); Emmanuel John Athans, Lake Forest Park, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/251,304

(22) Filed: Oct. 3, 2011

(65) Prior Publication Data

US 2013/0086105 A1    Apr. 4, 2013

(51) Int. Cl.
*G06F 17/30* (2006.01)
(52) U.S. Cl.
CPC .... *G06F 17/30277* (2013.01); *G06F 17/30864* (2013.01)
(58) Field of Classification Search
CPC .................. G06F 17/30424; G06F 17/30864; G06F 17/30867; G06F 17/30241; G06F 17/30477
USPC .................................................. 707/736, 769
See application file for complete search history.

(56) References Cited

U.S. PATENT DOCUMENTS

| | | | |
|---|---|---|---|
| 5,579,471 A * | 11/1996 | Barber et al. | 715/700 |
| 6,192,343 B1 | 2/2001 | Morgan et al. | |
| 6,999,932 B1 | 2/2006 | Zhou | |
| 7,610,546 B1 * | 10/2009 | Nagao et al. | 715/203 |
| 7,725,307 B2 | 5/2010 | Bennett | |
| 7,836,060 B1 * | 11/2010 | Rennison | 707/749 |
| 7,945,439 B2 | 5/2011 | Asano et al. | |
| 2006/0031240 A1 * | 2/2006 | Eyal et al. | 707/100 |
| 2006/0085766 A1 * | 4/2006 | Dominowska et al. | 715/854 |
| 2007/0061855 A1 * | 3/2007 | Serita et al. | 725/100 |
| 2008/0154611 A1 | 6/2008 | Evermann et al. | |
| 2009/0087035 A1 * | 4/2009 | Wen et al. | 382/118 |
| 2009/0113475 A1 * | 4/2009 | Li | 725/39 |
| 2009/0210226 A1 * | 8/2009 | Ma | 704/236 |
| 2009/0234711 A1 * | 9/2009 | Ramer et al. | 705/10 |
| 2009/0276419 A1 * | 11/2009 | Jones et al. | 707/5 |
| 2010/0070483 A1 * | 3/2010 | Delgo et al. | 707/706 |

(Continued)

OTHER PUBLICATIONS

Ajmera, et al., "Two-Stream Indexing for Spoken Web Search", Retrieved at <<http://www.www2011india.com/proceeding/companion/p503.pdf>>, Proceedings of the 20th international conference companion on World wide web (WWW), Mar. 28-Apr. 1, 2011, pp. 503-512.

(Continued)

*Primary Examiner* — Cam-Y Truong
(74) *Attorney, Agent, or Firm* — Ben Tabor; Kate Drakos; Micky Minhas

(57) ABSTRACT

Various technologies described herein pertain to voice directed context sensitive visual searching. Visual content can be rendered on a display, and a voice directed query related to the visual content can be received. Contextual information related to the visual content can also be identified. Moreover, a search word recognized from the voice directed query and/or the contextual information can be used to detect an object from the visual content, where the object can be a part of the visual content. Further, a search can be performed using the object detected from the visual content, and a result of the search can be rendered on the display.

19 Claims, 10 Drawing Sheets

(56) References Cited

U.S. PATENT DOCUMENTS

| | | | |
|---|---|---|---|
| 2010/0205202 A1* | 8/2010 | Yang et al. | 707/767 |
| 2011/0047163 A1* | 2/2011 | Chechik et al. | 707/741 |
| 2011/0075851 A1 | 3/2011 | LeBoeuf et al. | |
| 2011/0103699 A1* | 5/2011 | Ke et al. | 382/209 |
| 2013/0002828 A1* | 1/2013 | Ding et al. | 348/49 |

OTHER PUBLICATIONS

Lv, et al., "Ferret: A Toolkit for Content-Based Similarity Search of Feature-Rich Data", Retrieved at <<http://www.cs.princeton.edu/cass/papers/Ferret.pdf>>, Proceedings of the 1st ACM SIGOPS/EuroSys European Conference on Computer Systems (EuroSys), Apr. 18-21, 2006, pp. 317-330.

* cited by examiner

600

700

VOICE DIRECTED CONTEXT SENSITIVE VISUAL SEARCH

BACKGROUND

In conventional computing environments, users commonly supply queries to a search engine to search for information. Search engines can assist finding information stored in various network accessible information sources, such as web servers for the Internet. For instance, a user can provide a query to a user interface of a search engine, and the search engine can perform a search and return results in response to the query. Oftentimes, results of a search are presented in a list; commonly, a list of Universal Resource Locators (URLs) associated with information stored in various network-accessible information sources is returned. However, other approaches involve returning a single result in response to a query.

A user oftentimes enters a query into a user interface of a search engine by typing a set of words that form the query into the user interface. More recently, other forms of supplying queries to a search engine have become more prevalent. For example, voice-enabled search allows a user to provide a voice query to a search engine. Following this example, voice recognition can be used to identify search words from the voice query, and the search engine can perform a search using the identified search words.

Moreover, another type of searching that has recently developed is reverse visual searching. When employing a reverse visual search, a user can submit an image to the search engine, and the search engine can perform a search based on the submitted image. Search engines that support reverse visual searching typically utilize a still image as an input as opposed to search words. According to an example, an image of a 22 pound newborn baby can be provided as an input for a reverse visual search. The search engine can use the image of the 22 pound newborn baby to search for matches or near matches of the image rather than employing search words (e.g., provided via typing, speaking, etc.). The reverse visual search can generate results that indicate information such as a source of the image, whether the image has been altered or if altered versions exist, or other information related to the image. However, tailoring of conventional reverse visual searches to an interest of a user is oftentimes difficult, and thus, a large number of irrelevant results can be returned in response to such conventional reverse visual searches. Moreover, returning a large number of irrelevant results can increase a length of time that the user spends when attempting to find information and make finding relevant results more difficult for the user.

SUMMARY

Described herein are various technologies that pertain to voice directed context sensitive visual searching. A voice directed query that relates to visual content rendered on a display can be received. The visual content can be a frame from a video stream, a still image, or the like. Further, contextual information related to the visual content can be identified. Moreover, an object can be detected from the visual content as a function of a search word recognized from the voice directed query and/or the contextual information. For instance, the object can be a part of the visual content. A search can further be performed using the object detected from the visual content, and a result of the search can be rendered on the display.

According to various embodiments described herein, a video stream can be rendered on a display. A voice directed query that includes a command and/or a search word (or plurality of search words) can be received from a user viewing the video stream. In response to the command recognized from the voice directed query, a frame from the video stream can be captured (e.g., stored, continued to be rendered on the display, etc.). Further, contextual information pertaining to the frame can be identified. Moreover, an object can be detected from the frame based on the contextual information and/or the search word (or plurality of search words), and a search can be executed utilizing the detected object. The object can be a portion of the frame, and thus, the search can be tailored as a function of the contextual information and/or the search word (or plurality of search words) to generate a result.

In accordance with other embodiments set forth herein, a still image can be rendered on a display. Further, a voice directed query that relates to the still image can be received, and contextual information pertaining to the still image can be recognized. The contextual information and/or a search word (or plurality of search words) recognized from the voice directed query can be employed to detect an object from the still image, where the object can be a portion of the still image. Further, a search can be performed using the object detected from the still image to generate a result.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
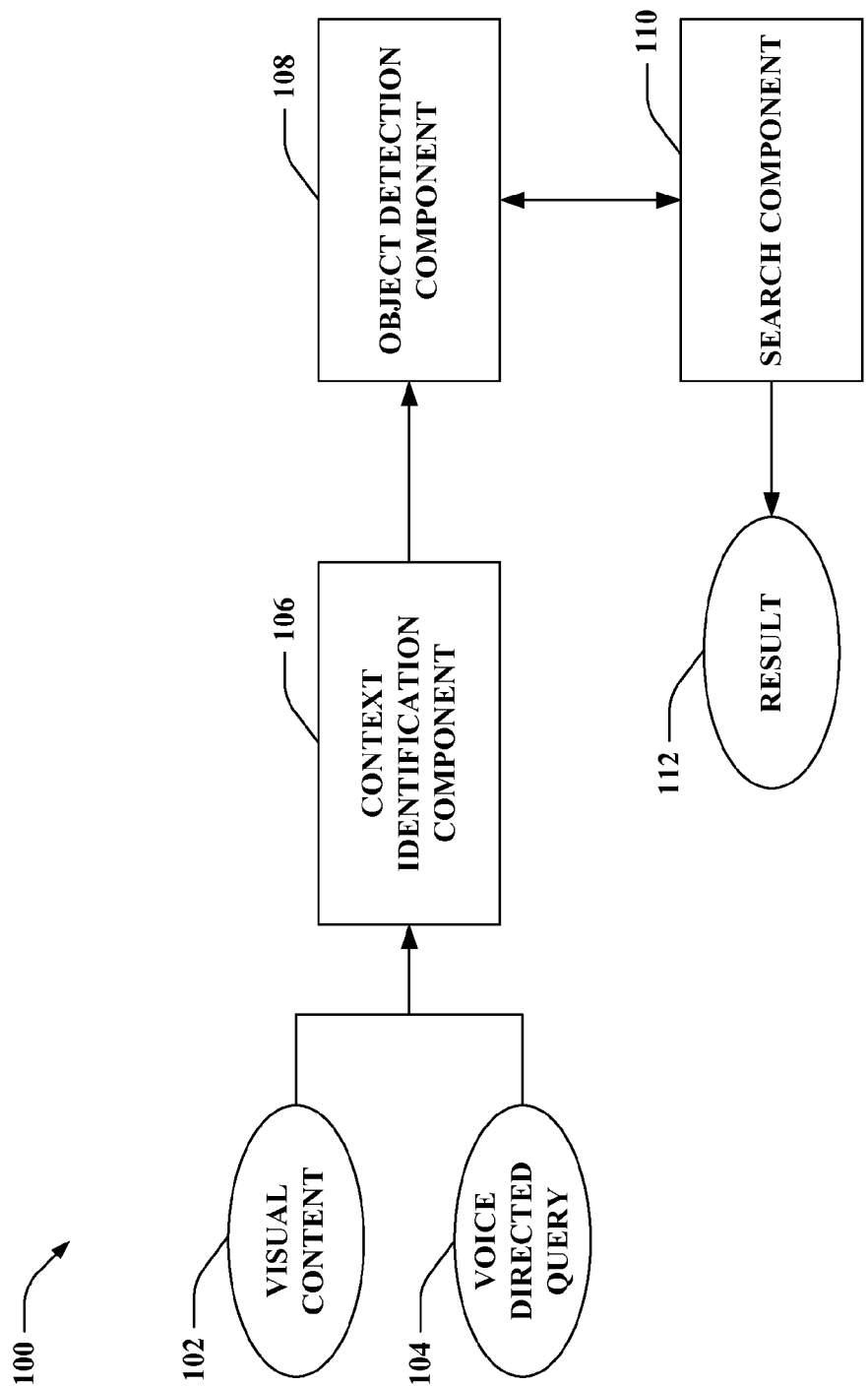
FIG. 1 illustrates a functional block diagram of an exemplary system that performs a visual search.

Various technologies pertaining to voice directed context sensitive visual searching are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As set forth herein, a voice directed context sensitive visual search can be performed. A voice directed query related to visual content rendered on a display can be received, and contextual information that relates to the visual content and/or the voice directed query can be identified. Search words from the voice directed query and/or the contextual information can be used to detect an object from the visual content. For instance, the object can be a part of the visual content. Further, a search that uses at least the object detected from the visual content can be performed to generate context sensitive query result(s). Accordingly, accuracy of context sensitive search result(s) outputted by the search can be improved compared to result(s) provided by conventional reverse visual searching techniques by using a combination of the voice directed query in conjunction with image processing (e.g., object detection) of the visual content based on the contextual information and/or the search words from the voice directed query.

Referring now to the drawings, FIG. 1 illustrates a system 100 that performs a visual search. Visual content 102 and a voice directed query 104 can be inputted to the system 100. The visual content 102 can be rendered on a display. The visual content 102, for example, can be a frame from a video stream, a still image, or the like. It is contemplated that the visual content 102 can be a two-dimensional or three-dimensional image. Moreover, the voice directed query 104 related to the visual content 102 can be received from a user. For example, the voice directed query 104 can cause the visual content 102 to be inputted to the system 100. Following this example, a command (e.g., voice command such as the term "snapshot") can be recognized from the voice directed query 104, and the visual content 102 can be inputted to the system 100 upon recognizing the command; however, it is to be appreciated that the claimed subject matter is not limited to the aforementioned example. Moreover, a search word (e.g., keyword) can be recognized from the voice directed query 104; although much of the description herein describes a search word being recognized from the voice directed query 104 and utilized in connection with executing a search, it is to be appreciated that more than one search word can similarly be recognized from the voice directed query 104 and utilized in connection with executing a search.

The system 100 includes a context identification component 106 that can receive the visual content 102 and the voice directed query 104. The context identification component 106 can recognize contextual information related to the visual content 102 rendered on the display. Additionally or alternatively, the context identification component 106 can recognize contextual information related to the voice directed query 104. According to an example, the contextual information obtained by the context identification component 106 can relate to the visual content 102 (e.g., metadata, etc.), a device used to render the visual content 102, a device used to create the visual content 102, the voice directed query 104 (e.g., search word(s) and/or commands recognized from the voice directed query 104, etc.), a user from whom the voice directed query 104 is received, or the like. The contextual information, for instance, can be utilized to enhance effectiveness of a search executed by the system 100.

Moreover, the system 100 includes an object detection component 108 that can detect an object from the visual content 102. The object can be a part of the visual content 102, and in an example can be a physical entity that is captured in the visual content 102. The object detection component 108 can detect the object from the visual content 102 based on a search word recognized from the voice directed query 104 and/or the contextual information recognized by the context identification component 106. The object recognized by the object detection component 108 can be a portion of the visual content 102 of interest to a user. Further, the object detection component 108 can employ signal processing to identify the object from the visual content 102 based on the search word and/or the contextual information.

According to an illustration, the visual content 102 can depict a leaf, a bucket, and a handle of a rake. Following this illustration, the voice directed query 104 can include the search words "maple leaf." Thus, the object detection component 108 can process the visual content 102 to detect the leaf in the visual content 102 based on the search words "maple leaf" included in the voice directed query. The object detection component 108, for instance, can extract the detected leaf from the visual content 102 (e.g., visually extract the part of the visual content 102 in which the user is interested).

The system 100 additionally includes a search component 110 that can perform a search using the object detected from the visual content 102. Accordingly, the search component 110 can search for information pertaining to the object detected from the visual content 102. Since the object detected from the visual content 102 is used for executing the search rather than the visual content 102, more relevant result(s) for the search can be returned by the search component 110. Moreover, the search component 110 can perform the search using the search word from the voice directed query 104 and/or the contextual information recognized by the context identification component 106. The search component 110 can generate a result 112 in response to the search. The result 112 generated by the search component 110, for instance, can be rendered on the display. It is contemplated that the result 112 and the visual content 102 can be rendered on the same display and/or different displays.

The search component 110 can perform various types of searches. According to an example, the search component 110 can perform a reverse visual search. Following this example, the object detected from the visual content 102 can be used as an input for the reverse visual search. Additionally or alternatively, the search component 110 can perform a search that uses text (e.g., the search word, contextual information, etc.) as an input. By way of example, the search component 110 can perform a reverse visual search that is further narrowed by text (e.g., the search word, contextual information, etc.); yet, the claimed subject matter is not so limited. Moreover, it is also contemplated that the search component 110 can perform a search that uses a document, sound, and so forth as an input.

In addition to performing the search using the object detected from the visual content 102, the search component 110 can perform a disparate search (or a plurality of disparate searches) that can enable the object detection component 108 to detect the object from the visual content 102. For instance, the search component 110 can perform the disparate search using the search word recognized from the voice directed query 104 and/or the contextual information. Thus, the search word recognized from the voice directed query 104 and/or the contextual information can be used by the search component 110 to return a preliminary set of images (e.g., responsive to the disparate search) that can be used to aid in edge detection processing and/or object detection processing of the visual content 102 (e.g., frame from a video stream, still image, etc.) performed by the object detection component 108. Further, a result of the disparate search can be provided to the object detection component 108. Moreover, the object detection component 108 can detect the object from the visual content 102 based on the result from the disparate search. Accordingly, the disparate search performed by the search component 110 using the search word and/or the contextual information can be employed by the object detection component 108 to process the visual content 102 for detecting the object. In accordance with another example, a plurality of disparate searches can be performed by the search component 110 to progressively refine the object detected from the visual content 102 by the object detection component 108 (e.g., the object detected from the visual content 102 can be narrowed through multiple disparate searches).

According to an example, images can be returned by the search component 110 in response to the disparate search performed using the search word recognized from the voice directed query 104 and/or the contextual information. These images can be used by the object detection component 108 to guide and/or refine detection of the object from the visual content 102. The detected object can thereafter be fed back to the search component 110 to perform a reverse image search. Accordingly, the search word from the voice directed query 104, the contextual information, and the extracted image can be cycled back against each other to produce a progressively refined results set.

The system 100 enables a user to supply the voice directed query 104 upon observing the visual content 102. Hence, when watching a video stream, viewing a still image, or the like, the user can input the voice directed query 104 to inquire about information related to the video stream, still image, etc. According to an example, if the user is watching a video stream (e.g., a live broadcast of a television program or movie, playback of a stored video, or substantially any other type of video being rendered on a display), the user can input a command (e.g., voice command such as the term "snapshot") as part of the voice directed query 104 to capture a frame (e.g., the visual content 102) out of the video stream. Further, the user can ask for information related to the video stream, or the frame in particular, as part of the voice directed query 104. The voice directed query 104 can include a natural language query; thus, the user can speak a sentence or phrase related to the video stream, and a search word (or search words) can be identified from a set of words included in the sentence or phrase. The captured frame (e.g., the visual content 102) and the search word from the natural language query (e.g., the voice directed query 104) can be inputted to the system 100 to perform a visual search and generate the result 112 as described in greater detail herein.

In contrast to conventional searching, the system 100 can support a natural voice input from the user (e.g., the voice directed query 104 can include a natural language query) in conjunction with the visual content 102, and hence, the result 112 provided by the search component 110 can have an increased relevancy compared to results typically provided by conventional search techniques. Thus, the user can describe or ask a question concerning something from the visual content 102 in which she has interest, which can be utilized to direct a search towards information of interest to the user pertaining to the visual content 102. Moreover, as opposed to conventional reverse visual search approaches, the system 100 supports capturing a frame from a video stream or a still image to be utilized as part of the reverse visual search; however, the claimed subject matter is not limited to the visual content 102 being a frame from a video stream or a still image.

Figure 2:
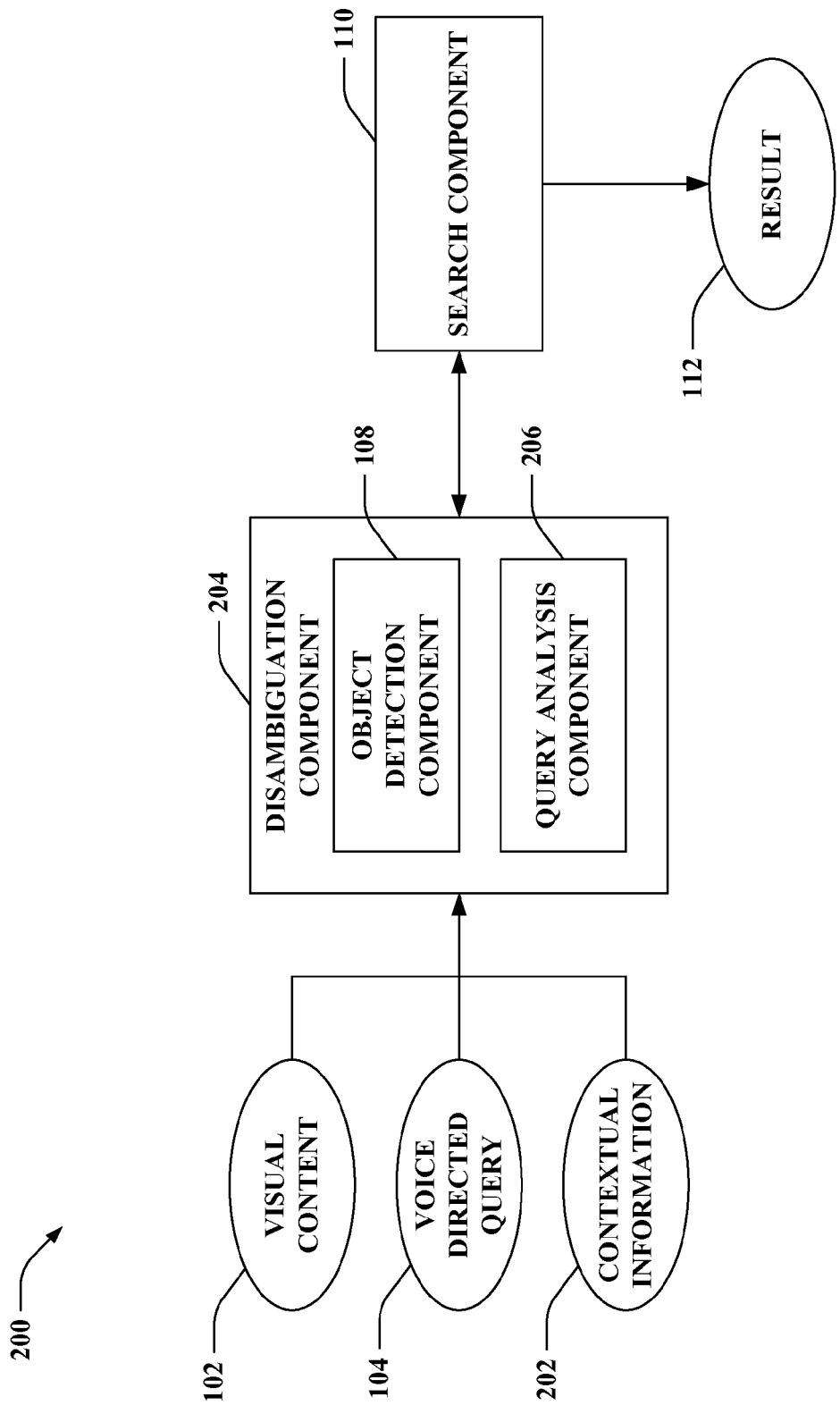
FIG. 2 illustrates a functional block diagram of an exemplary system that uses visual content, a voice directed query, and contextual information to provide a context sensitive search result.

Now referring to FIG. 2, illustrated is a system 200 that uses the visual content 102, the voice directed query 104 (or the search word from the voice directed query 104), and contextual information 202 to provide a context sensitive search result (e.g., the result 112). The system 200 includes a disambiguation component 204 that disambiguates the visual content 102 and/or the search word from the voice directed query 104. For instance, the contextual information 202 (e.g., recognized by the context identification component 106 of FIG. 1) can be utilized by the disambiguation component 204. Further, the disambiguation component 204 can disambiguate the visual content 102 and/or the search word by using results of one or more searches performed by the search component 110. Accordingly, the system 200 can perform a plurality of searches with the search component 110, where one or more searches from the plurality of searches can be employed by the disambiguation component 204 to disambiguate the visual content 102 and/or the search word, and a different search from the plurality of searches can employ the visual content 102 and/or the search word as disambiguated to produce the result 112.

Moreover, the disambiguation component 204 includes the object detection component 108 and a query analysis component 206. As noted herein, the object detection component 108 can detect the object from the visual content 102 based on the search word from the voice directed query 104 and/or the contextual information 202. Further, the query analysis component 206 can disambiguate the search word from the voice directed query 104. The query analysis component 206 can disambiguate the search word based on the visual content 102 and/or the contextual information 202.

According to an example, the search component 110 can perform the search that generates the result 112 using the object detected from the visual content 102 by the object detection component 108 with the search word as disambiguated by the query analysis component 206. Pursuant to this example, disambiguated search word provided by the query analysis component 206 can be an additional search term. Hence, the search component 110 can generate the result 112 using the additional search term and the detected object.

By way of another example, the query analysis component 206 can disambiguate the search word, and the disambiguated search word can be utilized by the object detection component 108 to detect the object from the visual content 102. Following this example, the disambiguated search word can be employed as part of the signal processing of the visual content 102 by the object detection component 108 to detect the object. Hence, the disambiguated search word can narrow the part of the visual content 102 used for the search. Further, the search component 110 can thereafter perform the search that generates the result 112 using the object detected as a function of the disambiguated search word.

Figure 3:
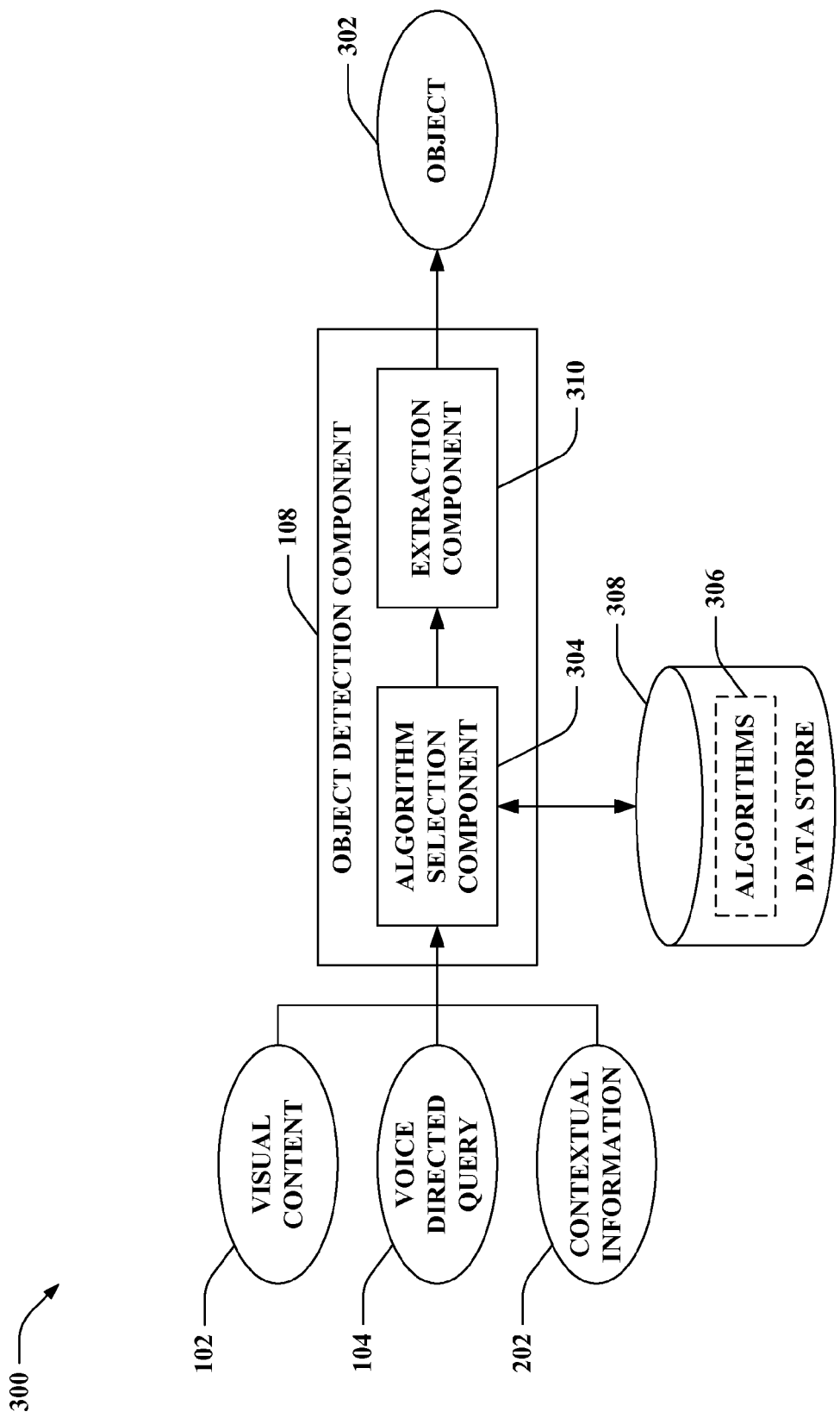
FIG. 3 illustrates a functional block diagram of an exemplary system that extracts an object from visual content.

Turning to FIG. 3, illustrated is a system 300 that extracts an object 302 from the visual content 102. In the system 300, the visual content 102, the voice directed query 104 (or the search word from the voice directed query 104), and the contextual information 202 can be inputted to the object detection component 108. Further, the object detection component 108 can extract the object 302 from the visual content 102 as a function of the search word from the voice directed query 104 and/or the contextual information 202.

The object detection component 108 includes an algorithm selection component 304 that can select an edge detection algorithm from a set of edge detection algorithms 306. The algorithm selection component 304 can choose the edge detection algorithm from the set of edge detection algorithms 306 based on the visual content 102, the search word from the voice directed query 104, and/or the contextual information 202. Further, the set of edge detection algorithms 306 can be retained in a data store 308. Moreover, the object detection component 108 further includes an extraction component 310 that can use the edge detection algorithm selected from the set of edge detection algorithms 306 by the algorithm selection component 304 to extract the object 302 from the visual content 102. It is also contemplated that more than one edge detection algorithm can be chosen and used to extract the object 302 from the visual content 102. Although not shown, it is to be appreciated that the search component 110 of FIG. 1 can perform the search using the object 302 extracted from the visual content 102.

According to an example, the object 302 extracted from the visual content 102 can be rendered with a result of a search on a display (e.g., rendered with the result 112 of FIG. 1). Additionally or alternatively, the object 302 extracted from the visual content 102 can be stored (e.g., in memory, the data store 308, etc.). For instance, a search can be performed using the object 302 stored as an input.

The data store 308 can include various types of edge detection algorithms in the set of edge detection algorithms 306. Accordingly, the algorithm selection component 304 can choose the edge detection algorithm from the set of edge detection algorithms 306 based upon a type of the object 302 to be extracted by the extraction component 310 (which can be detected by the algorithm selection component 304 from the visual content 102), the search word from the voice directed query 104, and/or the contextual information 202. By way of illustration, the set of edge detection algorithms 306 can include edge detection algorithms for recognizing people, faces, animals, clothing, plants, or substantially any other type of object that can be extracted from visual content. Pursuant to an example, if the visual content 102 depicts ten people and trees in the background and the voice directed query 104 includes the search word "Fred," then the algorithm selection component 304 can select an edge detection algorithm used for recognizing people from the set of edge detection algorithms 306 as a function of the search word. Following this example, the extraction component 310 can use the selected edge detection algorithm to determine which part of the visual content 102 is Fred and extract that part of the visual content 102 to generate the object 302.

Figure 4:
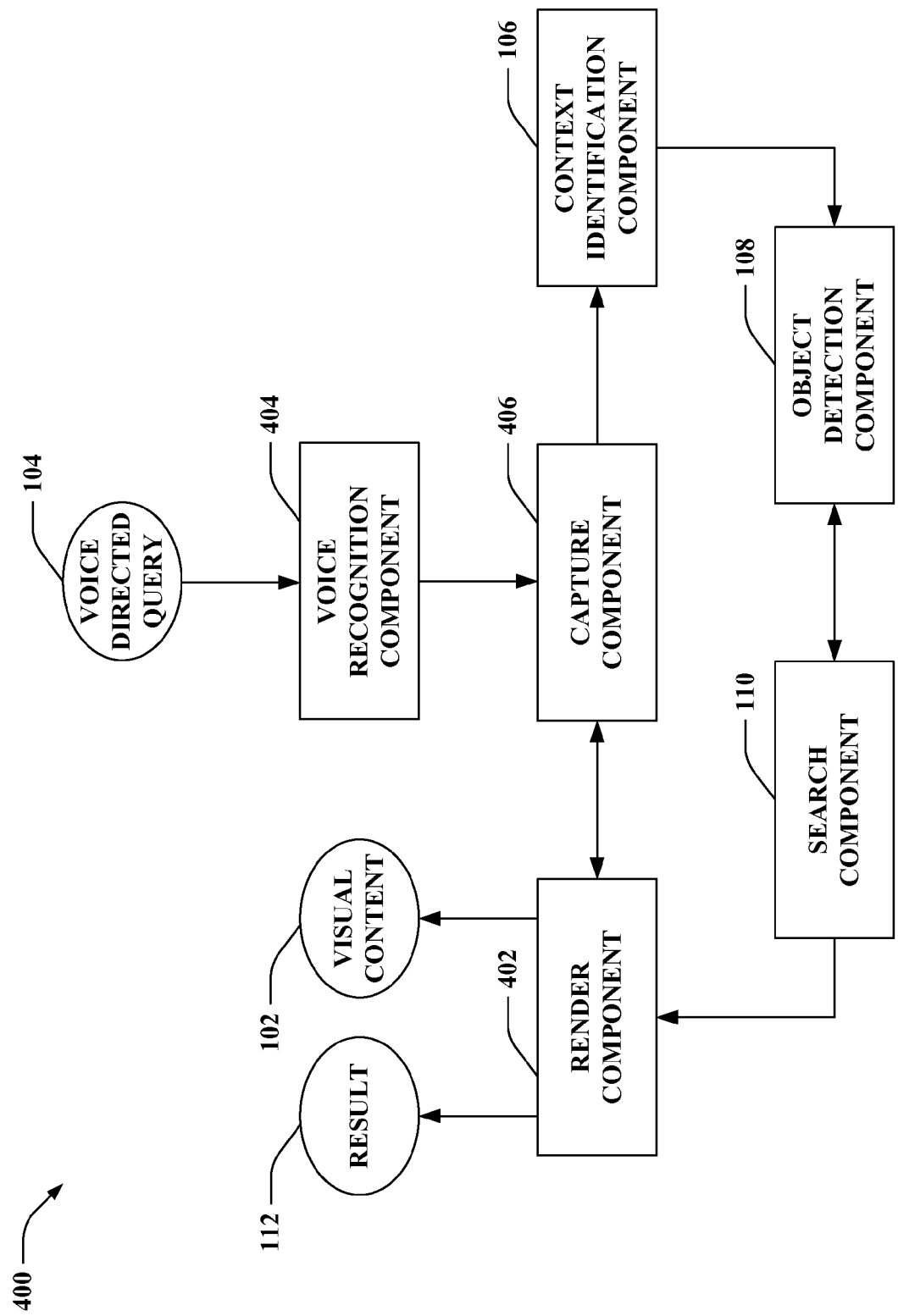
FIG. 4 illustrates a functional block diagram of an exemplary system that performs voice directed context sensitive visual searches with visual content rendered on a display.

With reference to FIG. 4, illustrated is a system 400 that performs voice directed context sensitive visual searches with visual content rendered on a display. The system 400 includes a render component 402 that renders the visual content 102 on a display. The visual content 102 can be, for example, a frame from a video stream, a still image, or the like. If the visual content 102 is a frame from a video stream, it is to be appreciated that the render component 402 can also render other frames from the video stream on the display.

It is to be appreciated that the visual content 102 can be from substantially any source. According to an example, the visual content 102 can be a frame included in a broadcasted live video stream. By way of another example, the visual content 102 can be a still image obtained by a camera. However, it is also contemplated that the visual content 102 can be a frame include in substantially any video stream or a still image from substantially any other source.

The system 400 further includes a voice recognition component 404 that can receive the voice directed query 104 from a user. The voice recognition component 404 can recognize a search word (or a plurality of search words) from the voice directed query 104. Additionally or alternatively, the voice recognition component 404 can recognize a command from the voice directed query 104. The command, for instance, can specify that the visual content 102 be captured; yet, it is contemplated that other commands in addition to or instead of a command that specifies capturing the visual content 102 can be included in the voice directed query 104.

According to an example, the voice recognition component 404 can detect a voice command such as the term "snapshot" within the voice directed query 104 received from the user. However, it is to be appreciated that other voice commands can be included in the voice directed query 104. By way of further example, the voice recognition component 404 can detect a natural language query within the voice directed query 104. Following this example, the natural language query can be a sentence or phrase spoken by the user. For instance, the set of words included in the sentence can be grouped by the user to express a statement, question, exclamation, request, command, suggestion, or the like. The voice recognition component 404 can identify a search word (or search words) from the set of words included in the sentence or phrase.

Moreover, the system 400 can include a capture component 406 that captures the visual content 102 in response to the voice command recognized by the voice recognition component 404 from the voice directed query 104. According to an example, the render component 402 can render the visual content 102 on the display, and the voice recognition component 404 can identify a command that specifies that the visual content 102 be captured from the voice directed query 104 received from a user. Following this example, in response to detecting such command, the capture component 406 can capture the visual content 102. For instance, the capture component 406 can cause the visual content 102 to be retained (e.g., in memory). Additionally or alternatively, the capture component 406 can cause the render component 402 to continue to render the visual content 102 or a portion thereof (e.g., the object extracted by the object detection component 108).

The visual content 102 acquired by the capture component 406, along with the search word (or search words) identified from the voice directed query 104 by the voice recognition component 404, can be inputted to the context identification component 106. The context identification component 106 can recognize contextual information pertaining to the visual content 102. Additionally or alternatively, the context identification component 106 can recognize contextual information related to the search word (or search words).

Moreover, as described herein, the object detection component 108 can detect the object from the visual content 102 based on the search word (or search words) and/or the contextual information. According to an example, although not shown, it is contemplated that the object detection component 108 can be included in a disambiguation component (e.g., the disambiguation component 204 of FIG. 2) along with a query analysis component (e.g., the query analysis component 206 of FIG. 2). Yet, it is to be appreciated that the claimed subject matter is not so limited.

Further, the search component 110 can perform a search using the object recognized by the object detection component 108. Further, it is contemplated that the search component 110 can perform a search using the search word (or search words) and/or the contextual information along with the object recognized by the object detection component 108. For example, the search word (or search words) used as part of a search can be disambiguated as described herein.

The search component 110 can generate the result 112, which can be rendered on the display by the render component 402. According to an example, the render component 402 can concurrently render the object detected from the visual content 102 along with the result 112 generated by the search component 110 on the display. Yet, it is to be appreciated that the claimed subject matter is not so limited.

By way of example, the render component 402 can render a top result provided by the search component 110 on the display. Following this example, secondary result(s) can be accessed with a spoken "next" command (e.g., identified by the voice recognition component 404) or substantially any other type of received input; however, the claimed subject matter is not so limited. For instance, pursuant to another example, a set of top results provided by the search component 110 can be rendered on the display by the render component 402.

The following sets forth an exemplary scenario related to the system 400. It is to be appreciated that the exemplary scenario is presented for illustration purposes, and the claimed subject matter is not limited to such scenario. According to the exemplary scenario, a user can employ a camera in his smartphone to take a picture of a leaf on a Japanese maple tree. The picture can also include a bucket in the background. Thus, the still image of the Japanese maple leaf with the bucket in the background can be the visual content 102 rendered on the display by the render component 402. It is to be appreciated that the picture of the Japanese maple leaf can be rendered by the render component 402 on substantially any device (e.g., the smartphone with the camera utilized to take the picture, a device employed to view the still image, etc.).

The user may be interested in finding information about a problem with the Japanese maple leaf. Following this exemplary scenario, the user can say "Japanese maple leaf problem," which can be the voice directed query 104. The voice recognition component 404 can receive the voice directed query 104 and identify the search words "Japanese maple leaf problem." Moreover, upon recognizing the search words, the voice recognition component 404 can cause the capture component 406 to acquire the picture of the Japanese maple leaf with the bucket in the background (e.g., the visual content 102).

The context identification component 106 can recognize contextual information related to the picture of the Japanese maple leaf with the bucket in the background and/or the search words "Japanese maple leaf problem." For example, the context identification component 106 can determine a geographic location at which the picture was taken with the camera of the smartphone based upon Global Positioning System (GPS) information from the smartphone. Moreover, the object detection component 108 can employ the search words to detect and extract the Japanese maple leaf from the remainder of the picture (e.g., detect and extract the object from the visual content 102) based on the search words "Japanese maple leaf." Thus, the object detection component 108 can disambiguate the part of the image that the user is focusing on based upon the search words from the voice directed query 104. According to an example, initial images can be retrieved in response to a first search performed by the search component 110 based on the search words and/or contextual information; the initial images can be used by the object detection component 108 to guide and/or refine detection and extraction of the object from the visual content 102 (e.g., the Japanese maple leaf from the remainder of the picture).

Further, the search component 110 can perform a search using the portion of the picture that depicts the Japanese maple leaf. The search performed by the search component 110 can further be narrowed by one or more of the search words and the geographic location (e.g., Northwest). By way of example, the search component 110 can perform a search using the search words "Japanese maple leaf problems," which can return a large set of results. Further, for instance, the set of results can be narrowed to results pertaining to the Northwest. Moreover, following this example, the search component 110 can compare images from the narrowed set of results to the portion of the picture that depicts the Japanese maple leaf to find an image from the narrowed set of results that most closely maps to the portion of the picture that depicts the Japanese maple leaf, which can be returned by the search component 110 as the result 112. Accordingly, the search component 110 can return a result (e.g., the result 112) tailored to the focus of the user. However, it is to be appreciated that the claimed subject matter is not limited to the foregoing example.

As illustrated by the above exemplary scenario, while the user may lack a rich vocabulary to describe the problem exhibited by the leaf, and thus may be unable to form a query that returns relevant results when employing conventional search techniques, the search component 110 can utilize at least the portion of the picture that depicts the Japanese maple leaf as disambiguated by the object detection component 108 to perform the search in the system 400. Moreover, the exemplary scenario illustrates that the still image of the Japanese maple leaf with the bucket in the background need not be edited by the user to perform the search (e.g., the user need not manually extract the portion of the image that depicts the Japanese maple leaf).

Moreover, it is to be appreciated that various other scenarios can related to the system 400. For instance, the system 400 can be utilized by a user to execute a voice directed context sensitive visual search for information concerning a product placed in a scene of a television show or a still image. Thus, the system 400 can return a result that specifies information related to the product, pictures of the product, links for purchasing the product, and so forth. According to another illustration, the system 400 can be employed by a user to execute a voice directed context sensitive visual search for information concerning a medical ailment of the user, which can be photographed by the user. In accordance with this illustration, the system 400 can perform a search for treatments, diagnoses, and so forth. By way of yet another example, a user can perform a voice directed context sensitive visual search for information pertaining to a broken product using the system 400; hence, the user can take a picture of the broken product and issue a voice directed query, which can be utilized by the system 400 to execute a search that can return a result related to the broken product (e.g., where to buy a replacement part, information concerning how to repair the product, etc.). It is to be appreciated, however, that the claimed subject matter is not limited to the foregoing exemplary scenarios.

Figure 5:
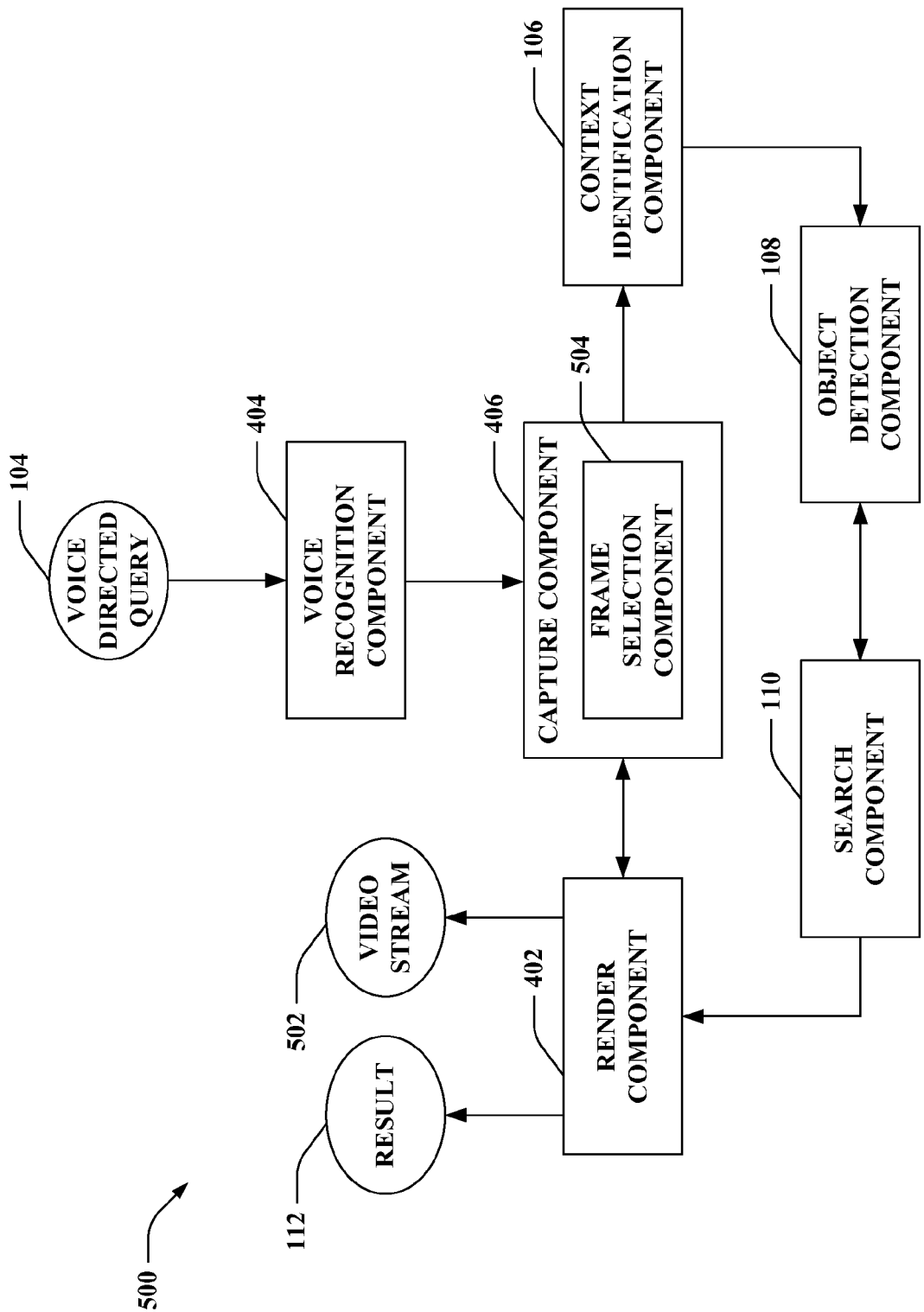
FIG. 5 illustrates a functional block diagram of an exemplary system that performs voice directed context sensitive visual searches with a video stream rendered on a display.

With reference to FIG. 5, illustrated is a system 500 that performs voice directed context sensitive visual searches with a video stream rendered on a display. According to the example depicted in FIG. 5, the render component 402 can render a video stream 502 on a display. Moreover, the voice recognition component 404 can receive the voice directed query 104, which can be related to the video stream 502 rendered on the display. As described herein, the voice recognition component 404 can identify a command and/or a search word from the voice directed query 104.

The capture component 406 can acquire visual content in response to the command identified by the voice recognition component 404 from the voice directed query 104. More particularly, the capture component 406 can include a frame selection component 504 that captures a frame from the video stream 502 in response to the command recognized from the voice directed query 104. The frame captured by the frame selection component 504 can be the visual content described herein. According to various examples, the frame selection component 504 can capture the frame from the video stream 502 rendered on the display at a time when the voice recognition component 404 receives the voice directed query 104 (e.g., when the voice recognition component 404 begins to receive the voice directed query 104, when the voice recognition component 404 finishes receiving the voice directed query 104, a time there between, etc.), when the voice recognition component 404 detects the command (e.g., upon recognizing a "snapshot" command from the voice directed query 104), when the frame selection component 504 receives the command, or the like However, the claimed subject matter is not limited to the foregoing examples.

Moreover, the system 500 includes the context identification component 106, the object detection component 108, and the search component 110 as described herein. Accordingly, the context identification component 106 can identify contextual information pertaining to the frame captured by the frame selection component 504. Further, the object detection component 108 can detect an object from the frame based on the search word identified from the voice directed query 104 and/or the contextual information identified by the context identification component 106. Moreover, the search component 110 can perform a search using the object detected from the frame, and a result can be generated based on the search.

The render component 402 can render the result 112 on the display. According to an example, the render component 402 can concurrently render the result 112 of the search and the video stream 502 on the display. By way of another example, the render component 402 can concurrently render the result 112 of the search, the object detected from the frame, and the video stream 502 on the display.

In accordance with an exemplary scenario, a user can be watching a television broadcast of a baseball game (e.g., the video stream 502). For instance, the user can be watching a baseball game between the Stars and the Arrows. When the user is watching Jose Garcia of the Stars at bat (e.g., the video stream 502 of the broadcasted television program is rendered on the display by the render component 402), the user may be interested in Jose Garcia's lifetime batting average. Accordingly, the user can initiate a search using the voice command "snapshot." The user can further disambiguate that he is interested in Jose Garcia's lifetime batting average by saying "Garcia lifetime batting average." Hence, the voice directed query 104 provided by the user can be "snapshot: Garcia lifetime batting average."

Following this scenario, the voice recognition component 404 can recognize the "snapshot" command, which can be utilized by the frame selection component 504 to acquire a frame from the video stream 502. According to an illustration, the acquired frame can depict Jose Garcia batting, a pitcher, a catcher, and an umpire. Further, the voice recognition component 404 can identify the search words "Garcia," "lifetime," and "batting average" from the voice directed query 104.

According to an example, visual confirmation can be rendered on the display by the render component 402 that the request of the user is being processed. Following this example, the search words detected by the voice recognition component 404 can be shown on the display. Further, a progress bar can also be rendered on the display. It is to be appreciated, however, that the claimed subject matter is not limited to the above-noted example.

Moreover, the context identification component 106 can recognize contextual information. For instance, the context identification component 106 can obtain metadata pertaining to the broadcasted video stream being watched, where the metadata can indicate the channel, sport, date and time, teams, etc. According to the exemplary scenario, the context identification component 106 can recognize that the user is watching the Stars and Arrows play baseball on Tuesday night.

The object detection component 108 can further detect an object from the frame based on the search words and/or the contextual information. For instance, the object detection component 108 can detect the players on screen or read uniform numbers and/or colors worn by players on screen from the frame. Moreover, the search component 110 can execute a search using the search words "Garcia," "lifetime," and "batting average." The search component 110 can further use the detected players on the screen, uniform numbers, colors, etc. detected from the frame. Accordingly, the detected object (e.g., players, uniform numbers, colors, etc.) can be used by the search component 110 to filter the results to statistics of the player in question (e.g., Jose Garcia). For example, Ryan Garcia may be a player on the Arrows, and he may not be in the frame acquired by the frame selection component 504. Accordingly, the detected object can be employed to disambiguate the search term "Garcia." Thus, the search component 110 can return a result that provides Jose Garcia's statistics rather than Ryan Garcia's statistics. According to a further example, upon completion of the search, a top result can immediately be displayed, while secondary results can be accessed with a spoken "next" command; yet, the claimed subject matter is not so limited. It is to be appreciated, however, that the claimed subject matter is not limited to the foregoing exemplary scenario.

Figure 6:
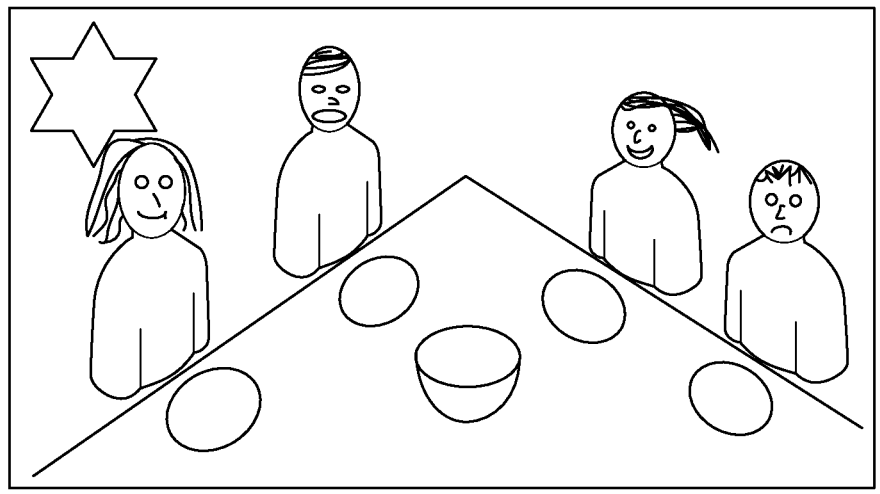
FIGS. 6-8 illustrate an exemplary scenario depicting performance of a voice directed context sensitive visual search.
Figure 7:
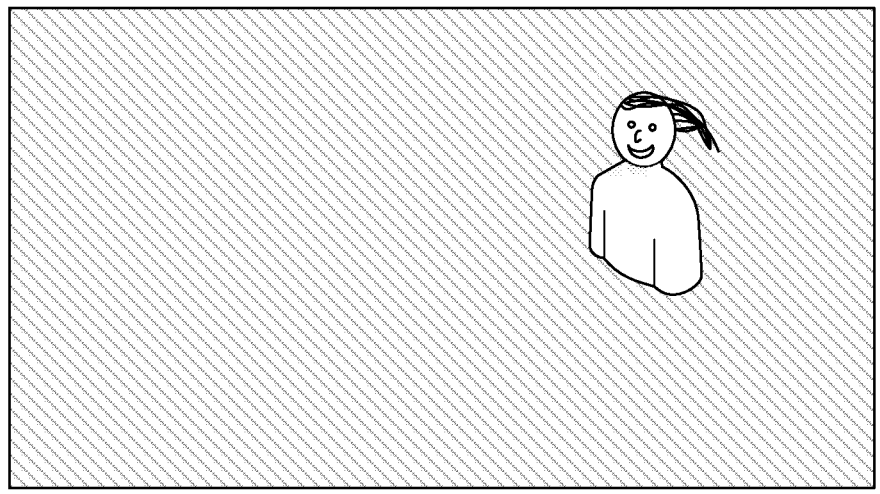
Figure 8:
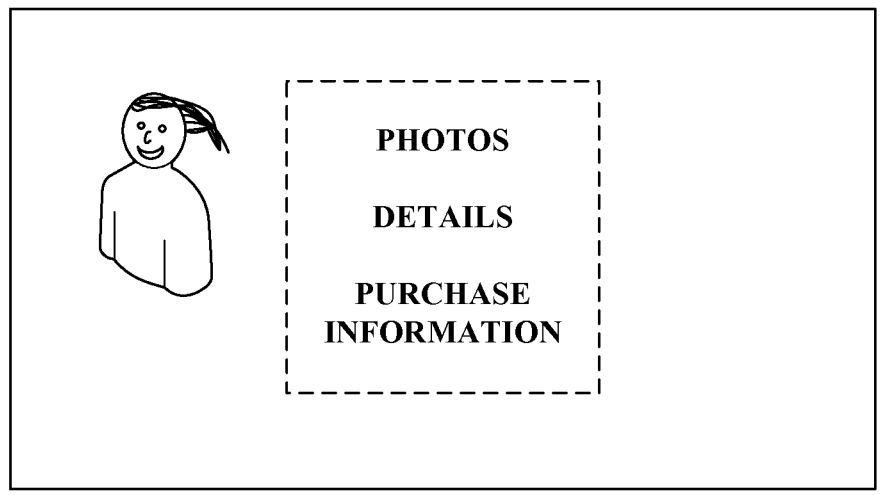

FIGS. 6-8 illustrate an exemplary scenario depicting performance of a voice directed context sensitive visual search. FIGS. 6-8 show various screenshots that can be rendered in connection with the voice directed context sensitive visual search. However, it is also contemplated that a subset of the screenshots need not be rendered. In the exemplary scenario, a user is watching a popular television show. It is to be appreciated that the exemplary scenario of FIGS. 6-8 is provided for illustration purposes, and it is not intended to limit the scope of the hereto appended claims.

Turning to FIG. 6, illustrated is an exemplary screenshot 600 rendered on a display. The screenshot 600 can be a frame from a broadcasted episode of the popular television show (e.g., a frame from a video stream). When watching the episode (e.g., when the screenshot 600 is rendered on the display), the user may be interested in an article of clothing worn by one of the actors. Accordingly, the user can initiate a search using the voice command "snapshot." The user can further disambiguate what she is interested in from the screenshot 600 by saying "Monica's shirt." Thus, the voice directed query provided by the user can be "snapshot: Monica's shirt."

Upon receiving the voice command, the frame depicted in the screenshot 600 can be captured. Moreover, relevant search words can be disambiguated and contextual information related to the frame and/or the search words can be obtained at the time of inquiry. For instance, in this scenario, the obtained contextual information can include information that specifies that the user is watching television. Further, metadata associated with the broadcasted episode of popular television show can be utilized to identify additional contextual information such as, for example, that the user is watching the popular television show, time of day of the broadcast, date of the broadcast, channel, particular episode being watched, original broadcast date of the episode being watched, characters in the particular episode or the series in general, actors that play the roles of the characters, and so forth.

Now referring to FIG. 7, illustrated is another exemplary screenshot 700. The screenshot 700 depicts an image of Monica being extracted from the frame shown in the screenshot 600 of FIG. 6. It is to be appreciated, however, that the screenshot 700 need not be rendered on the display; rather, the screenshot 700 can instead depict a result of signal processing performed on the frame from the screenshot 600 of FIG. 6.

By way of example, the search word "Monica" can be utilized, along with the contextual information, to perform a first search for images of Monica from the popular television show. The results of the first search can be utilized to identify who in the frame shown in the screenshot 600 of FIG. 6 is Monica. Thus, signal processing can be performed to identify a person in the screenshot 600 of FIG. 6 that maps to the images of Monica from the popular television show generated by the first search. Further, edge detection can be performed to determine which part of the extracted image is Monica's shirt. Hence, a part of Monica that is of interest can be distilled out (e.g., Monica's shirt can be detected). Accordingly, Monica's shirt can be detected and/or extracted using a multi-pass signal processing approach, where Monica can first be detected and then Monica's dress can be detected. Employing a multi-pass signal processing approach allows for progressively refining a portion of the frame to be extracted, for example.

It is also contemplated that the voice directed query can include adjectives such as color, size, and positional information describing the shirt, which can be used to assist in detecting the image of Monica's shirt; however, the claimed subject matter is not so limited. The portion of the image that shows Monica's shirt can thereafter be used in a second search (e.g., a reverse image search) to find a result. For instance, the portion of the image that shows Monica's shirt can be combined with broadcast metadata to execute the second search; yet, the claimed subject matter is not so limited. By way of further illustration, it is contemplated that the second search can be limited to searching databases of fashion materials (e.g., determined based on the search word "shirt"); however, the claimed subject matter is not so limited. Moreover, it is contemplated that more than two searches can be performed; for instance, more than one search can be performed in connection with detecting and extracting the portion of the image.

Turning to FIG. 8, illustrated is an exemplary screenshot 800 that includes a result of the voice directed context sensitive visual search. As depicted, the screenshot 800 includes the extracted image of Monica. Moreover, a result from the second search is rendered on the display. For instance, the result can include photos of the shirt worn by Monica, details about the shirt, and purchase information; yet, it is contemplated that substantially any other information can additionally or alternatively be included in the result rendered on the display. By way of further example, although not shown, it is to be appreciated that the extracted image of Monica and the result can be rendered on a portion of the display (e.g., in a window, etc.), while the video stream can continue to be rendered on the remainder of the display. In accordance with an alternative example, the video stream can continue to be rendered on the display while the extracted image of Monica and the result can be rendered on top of the video stream. It is also contemplated that the extracted image of Monica wearing the shirt can be replaced by an extracted image of the shirt in the screenshot 800, for example.

Figure 9:
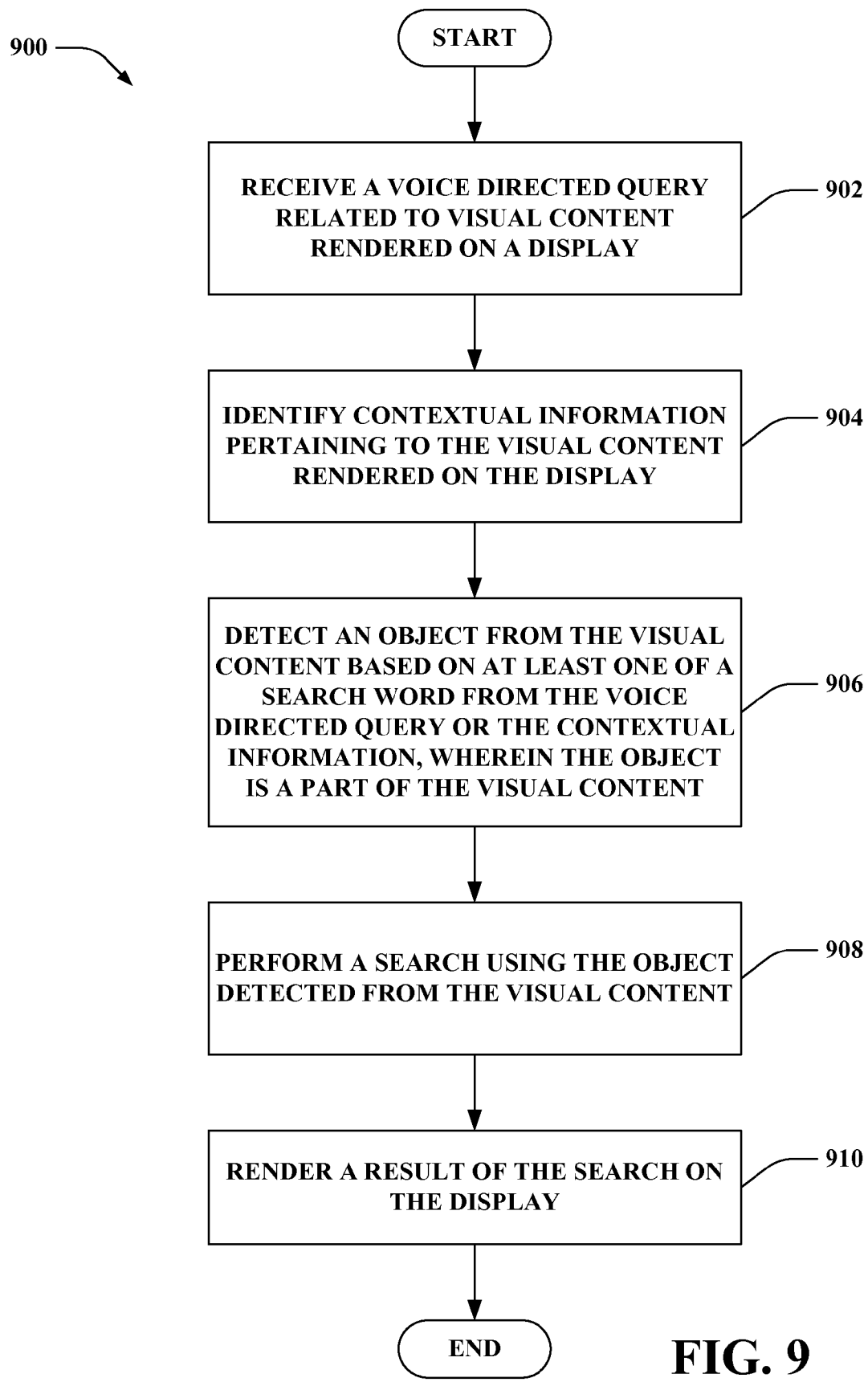
FIG. 9 is a flow diagram that illustrates an exemplary methodology for voice directed context sensitive visual searching.
Figure 10:
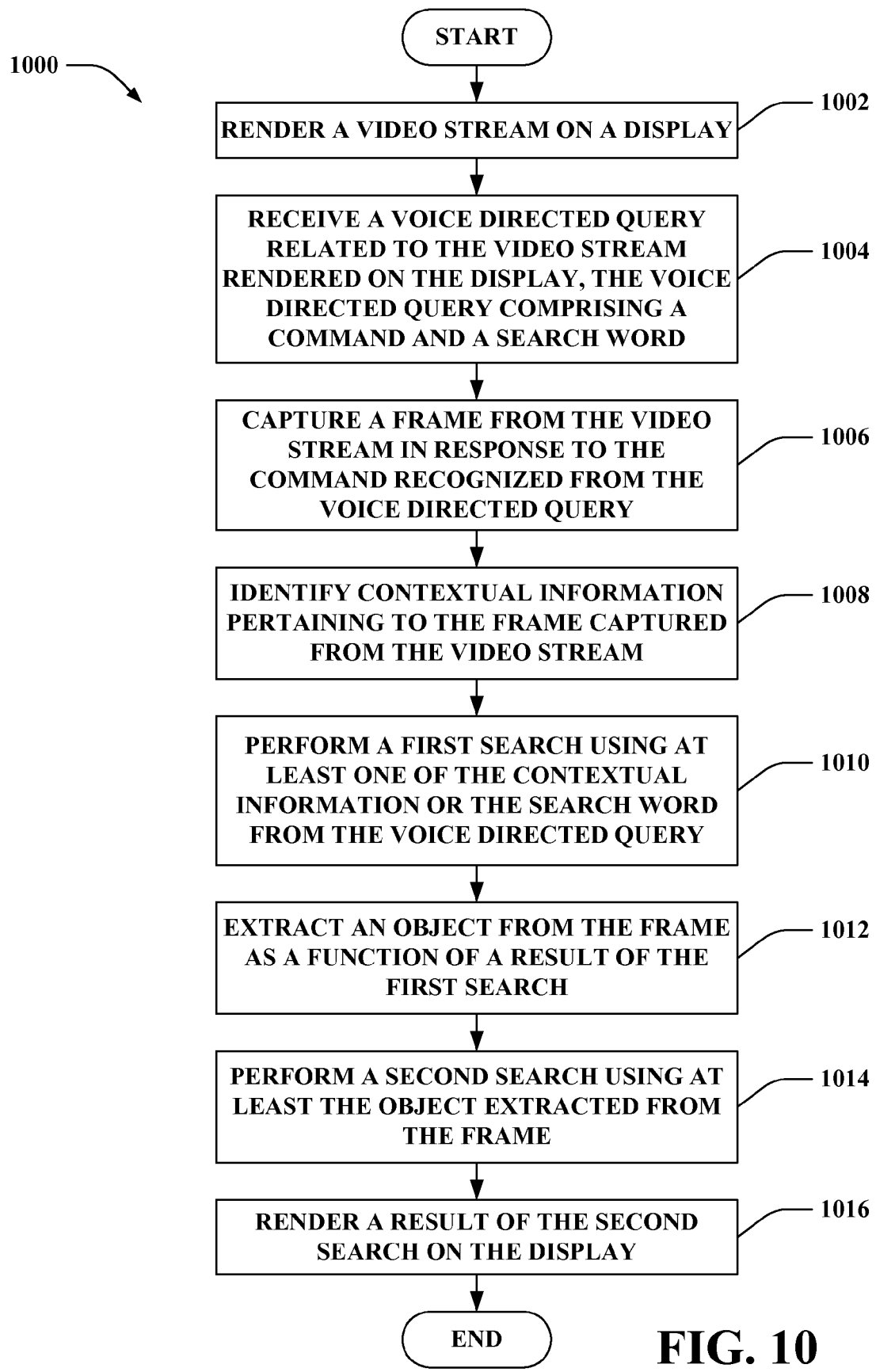
FIG. 10 is a flow diagram that illustrates an exemplary methodology for performing a visual search using a frame from a video stream.

FIGS. 9-10 illustrate exemplary methodologies relating to voice directed context sensitive searching. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 9 illustrates a methodology 900 for voice directed context sensitive visual searching. At 902, a voice directed query related to visual content rendered on a display can be received. For instance, the visual content can be a frame from a video stream, a still image, or the like. According to another example, a search word (or more than one search word) can be recognized from the voice directed query. Additionally or alternatively, a command can be recognized from the voice directed query; the visual content, for example, can be captured in response to the command recognized from the voice directed query. Capturing the visual content can refer to storing the visual content, continuing to render the visual content on a display, or the like. By way of another example, a frame from a video stream can be captured in response to the command recognized from the voice directed query, where the frame can be the visual content.

At 904, contextual information pertaining to the visual content rendered on the display can be identified. Moreover, it is contemplated that contextual information that pertains to the voice directed query can also be identified.

At 906, an object from the visual content can be detected based on at least one of a search word from the voice directed query or the contextual information. Additionally, the object can be a part of the visual content. Pursuant to an example, the object can be extracted from the visual content based on the at least one of the search word from the voice directed query or the contextual information. According to an illustration, an edge detection algorithm from a set of edge detection algorithms can be selected based on at least one of the visual content, the search word from the voice directed query, or the contextual information. Following this illustration, the object can be extracted from the visual content using the edge detection algorithm selected from the set of edge detection algorithms.

At 908, a search can be performed using the object detected from the visual content. Further, it is to be appreciated that the search can be performed using the search word from the voice directed query and/or the contextual information in addition to using the object detected from the visual content. Moreover, according to an example where the object is extracted from the visual content, it is contemplated that the search can be performed using the object extracted from the visual content.

Pursuant to another example, the search word from the voice directed query can be disambiguated based on at least one of the visual content or the contextual information. In accordance with this example, the search can be performed using the object detected from the visual content and the search word as disambiguated. By way of yet a further example, the object can be detected from the visual content by performing a disparate search using the at least one of the search word from the voice directed query or the contextual information, where the object can be detected from the visual content as a function of a result from the disparate search. Following this example, the result from the disparate search can include a set of images returned based on the search word from the voice directed query and/or the contextual information. Further, the result from the disparate search can be used to aid in detecting the object from the visual content. Thus, the result from the disparate search can guide and refine detection of the object from the visual content, where a reverse visual search can be performed using the object detected from the visual content.

At 910, a result of the search can be rendered on the display. According to an example, the object extracted from the visual content can be rendered with the result of the search on the display. By way of yet another example, the result of the search and a video stream can concurrently be rendered on the display, where the visual content can be a frame selected from the video stream. Following this example, it is further contemplated that the extracted object can also be rendered with the result of the search and the video stream; however, the claimed subject matter is not so limited.

Turning to FIG. 10, illustrated is a methodology 1000 for performing a visual search using a frame from a video stream. At 1002, a video stream can be rendered on a display. At 1004, a voice directed query related to the video stream rendered on the display can be received. The voice directed query can comprise a command and a search word. At 1006, a frame from the video stream can be captured in response to the command recognized from the voice directed query. At 1008, contextual information pertaining to the frame captured from the video stream can be identified.

At 1010, a first search can be performed using at least one of the contextual information or the search word from the voice directed query. At 1012, an object can be extracted from the frame as a function of a result of the first search. Thus, the first search can be utilized to disambiguate the frame. The result of the first search can include a set of images. Further, visual patterns detected in images included in the set of images, which are returned based on the contextual information and/or the search word from the voice directed query, can be used to aid edge detection and/or object detection in the frame from the video stream.

At 1014, a second search can be performed using at least the object extracted from the frame. At 1016, a result of the second search can be rendered on the display. For example, the result of the second search and the video stream can be concurrently rendered on the display; however, the claimed subject matter is not limited to the foregoing example.

Figure 11:
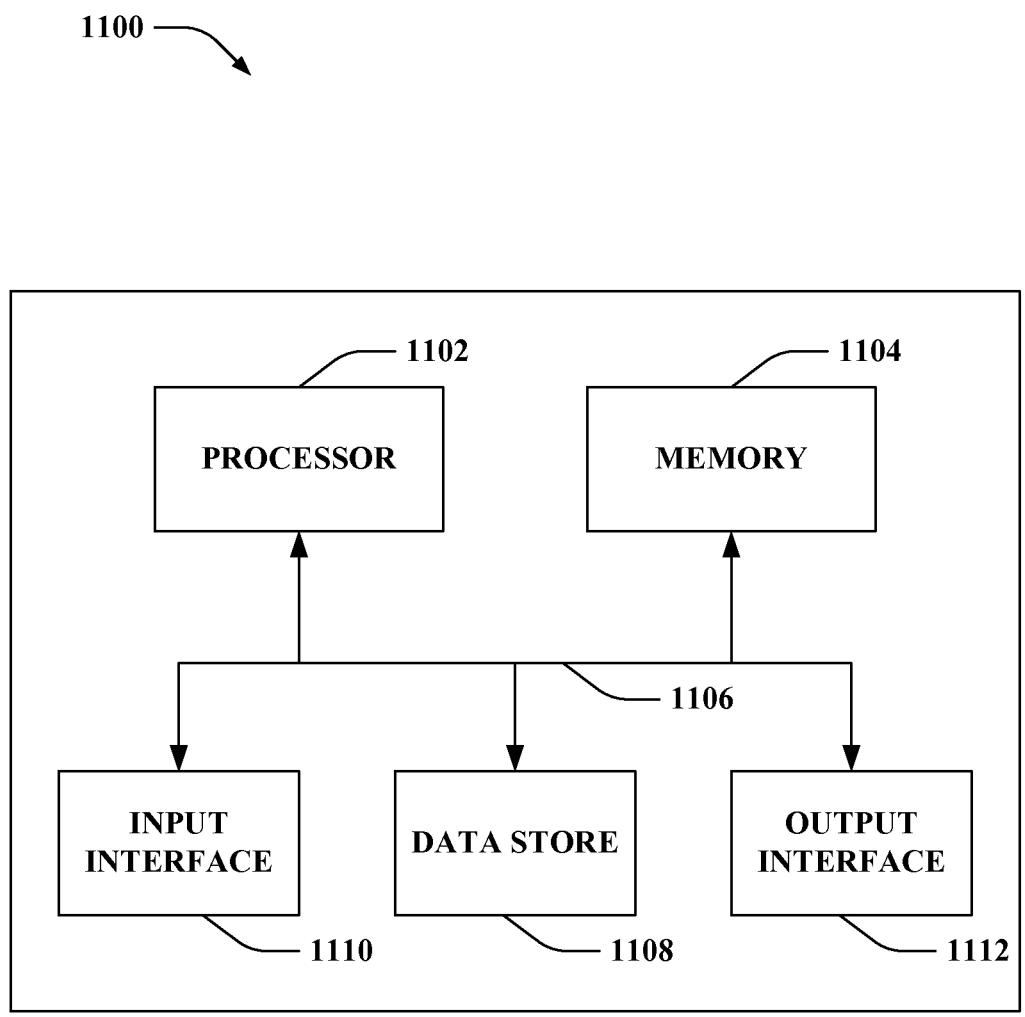
FIG. 11 illustrates an exemplary computing device.

Referring now to FIG. 11, a high-level illustration of an exemplary computing device 1100 that can be used in accordance with the systems and methodologies disclosed herein is illustrated. For instance, the computing device 1100 may be used in a system that performs a voice directed context sensitive visual search. The computing device 1100 includes at least one processor 1102 that executes instructions that are stored in a memory 1104. The instructions may be, for instance, instructions for implementing functionality described as being carried out by one or more components discussed above or instructions for implementing one or more of the methods described above. The processor 1102 may access the memory 1104 by way of a system bus 1106. In addition to storing executable instructions, the memory 1104 may also store visual content, contextual information, search word(s), and so forth.

The computing device 1100 additionally includes a data store 1108 that is accessible by the processor 1102 by way of the system bus 1106. The data store 1108 may include executable instructions, a set of edge detection algorithms, visual content, contextual information, search word(s), etc. The computing device 1100 also includes an input interface 1110 that allows external devices to communicate with the computing device 1100. For instance, the input interface 1110 may be used to receive instructions from an external computer device, from a user, etc. The computing device 1100 also includes an output interface 1112 that interfaces the computing device 1100 with one or more external devices. For example, the computing device 1100 may display text, images, etc. by way of the output interface 1112.

Additionally, while illustrated as a single system, it is to be understood that the computing device 1100 may be a distributed system. Thus, for instance, several devices may be in communication by way of a network connection and may collectively perform tasks described as being performed by the computing device 1100.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method of searching, comprising:
   receiving a voice directed query related to visual content rendered on a display, wherein the visual content is one of a frame from a video stream, a two-dimensional image, or a three-dimensional image;
   causing a processor to detect an object from the visual content based on a search word from the voice directed query;
   selecting an edge detection algorithm from a set of edge detection algorithms based on at least one of the visual content, the search word from the voice directed query, or contextual information;
   extracting an image of the object from the visual content based on the search word from the voice directed query, the image of the object being extracted from the visual content using the edge detection algorithm selected from the set of edge detection algorithms, wherein the image of the object is a portion of the visual content and is extracted from a remainder of the visual content;
   using the image of the object extracted from the visual content as an input for a reverse visual search, wherein the reverse visual search is executed based upon the image of the object extracted from the visual content, and wherein the reverse visual search returns a result; and
   rendering the result of the reverse visual search on the display.

2. The method of claim 1, further comprising narrowing the reverse visual search based on one or more of the search word from the voice directed query or the contextual information.

3. The method of claim 1, further comprising:
   disambiguating the search word from the voice directed query based on the visual content; and
   using the search word as disambiguated as an additional search term to return the result.

4. The method of claim 1, detecting the object from the visual content based on the search word from the voice directed query further comprises:
   using the search word from the voice directed query as an input for a disparate search;
   obtaining a result from the disparate search, wherein the result from the disparate search includes a set of images; and
   detecting the object from the visual content as a function of the result from the disparate search, wherein the result from the disparate search guides and refines detection of the object from the visual content.

5. The method of claim 1, further comprising rendering the image of the object extracted from the visual content with the result of the reverse visual search on the display.

6. The method of claim 1, further comprising capturing the visual content in response to a voice command recognized from the voice directed query.

7. The method of claim 1, further comprising capturing the frame from the video stream in response to a command recognized from the voice directed query, wherein the visual content is the frame from the video stream.

8. The method of claim 1, further comprising rendering the result of the reverse visual search and the video stream concurrently on the display, wherein the visual content is the frame selected from the video stream.

9. The method of claim 1, further comprising:
   disambiguating the search word from the voice directed query based on the contextual information; and
   using the search word as disambiguated as an additional search term to return the result.

10. The method of claim 1, wherein an edge of the image of the object is not delineated in the visual content prior to the detecting of the object.

11. A system that performs a visual search, comprising:
    a processor; and
    a memory that comprises a plurality of components that are executed by the processor, the plurality of components comprising:
        an object detection component that detects an object from visual content rendered on a display based on a search word recognized from a voice directed query related to the visual content, wherein the visual content is one of a frame from a video stream, a two-dimensional image, or a three-dimensional image;
        an algorithm selection component that selects an edge detection algorithm from a set of edge detection algorithms based on at least one of the visual content, the search word from the voice directed query, or contextual information;
        an extraction component that extracts an image of the object from the visual content using the edge detection algorithm selected from the set of edge detection algorithms, wherein the image of the object is a portion of the visual content and is extracted from a remainder of the visual content; and
        a search component that uses the image of the object extracted from the visual content as an input for a reverse visual search, wherein the reverse visual search is performed based upon the image of the object extracted from the visual content, and wherein the reverse visual search returns a result.

12. The system of claim 11, wherein the search component uses the search word recognized from the voice directed query as an input for a disparate search, and the object detection component detects the object from the visual content based on a result from the disparate search, wherein the result from the disparate search includes a set of images used by the object detection component to guide and refine detection of the object from the visual content.

13. The system of claim 11, wherein the plurality of components further comprises a query analysis component that disambiguates the search word from the voice directed query, wherein the search component uses the search word as disambiguated as an additional search term to return the result.

14. The system of claim 11, wherein the plurality of components further comprises a render component that concurrently renders the image of the object from the visual content and the result generated by the search component on a display.

15. The system of claim 11, the search component further narrows the reverse visual search based on one or more of the search word from the voice directed query or the contextual information.

16. The system of claim 11, wherein the plurality of components further comprises a context identification component that recognizes contextual information related to at least one of the visual content rendered on the display or the voice directed query related to the visual content, wherein the object detection component further detects the object from the visual content based on the contextual information.

17. A computer-readable memory including computer-executable instructions that, when executed by a processor, cause the processor to perform acts including:
    rendering visual content on a display, wherein the visual content is one of a frame from a video stream, a two-dimensional image, or a three-dimensional image;
    receiving a voice directed query related to the visual content rendered on the display, wherein the voice directed query comprises at least a search word;
    using the search word from the voice directed query as an input for a first search;
    detecting an object from the visual content as a function of a first result of the first search;
    selecting an edge detection algorithm from a set of edge detection algorithms;
    extracting an image of the object from the visual content using the edge detection algorithm selected from the set of edge detection algorithms, wherein the image of the object is a portion of the visual content and is extracted from a remainder of the visual content;
    using the image of the object extracted from the visual content as an input for a reverse visual search, wherein the reverse visual search is executed based upon the image of the object extracted from the visual content; and
    rendering a second result of the reverse visual search on the display.

18. The computer-readable memory of claim 17, wherein the computer-executable instructions, when executed by the processor, further cause the processor to perform acts including:
    rendering the second result of the reverse visual search and the video stream concurrently on the display, wherein the visual content is the frame selected from the video stream.

19. The computer-readable memory of claim 17, wherein the edge detection algorithm is selected from the set of edge detection algorithms based on at least one of the visual content or the search word from the voice directed query.

* * * * *